United States Patent
Stoner et al.

(10) Patent No.: US 10,447,692 B2
(45) Date of Patent: Oct. 15, 2019

(54) AUTO-CREATION OF APPLICATION PASSWORDS

(71) Applicant: Oath Inc., New York, NY (US)

(72) Inventors: Chris Stoner, San Jose, CA (US); Assaf Kremer, Menlo Park, CA (US)

(73) Assignee: Oath Inc., New York, NY (US)

( * ) Notice: Subject to any disclaimer, the term of this patent is extended or adjusted under 35 U.S.C. 154(b) by 0 days.

(21) Appl. No.: 14/675,419

(22) Filed: Mar. 31, 2015

(65) Prior Publication Data
US 2016/0292412 A1   Oct. 6, 2016

(51) Int. Cl.
*H04L 29/06* (2006.01)
*G06F 21/45* (2013.01)
*G06F 21/44* (2013.01)

(52) U.S. Cl.
CPC ......... *H04L 63/0876* (2013.01); *G06F 21/44* (2013.01); *G06F 21/45* (2013.01); *H04L 63/0815* (2013.01); *H04L 63/0838* (2013.01)

(58) Field of Classification Search
CPC ............. H04L 63/0815; H04L 63/0838; H04L 63/0876
See application file for complete search history.

(56) References Cited

U.S. PATENT DOCUMENTS

| | | | |
|---|---|---|---|
| 7,136,490 B2 | 11/2006 | Martinez et al. | |
| 7,523,318 B2 | 4/2009 | Goal et al. | |
| 8,234,696 B2 | 7/2012 | O'Malley et al. | |
| 8,868,683 B1* | 10/2014 | Bacastow | G06F 21/305 709/217 |
| 9,148,408 B1* | 9/2015 | Glazemakers | H04L 63/029 |
| 9,450,939 B2* | 9/2016 | Zhou | H04L 63/1441 |
| 9,602,501 B1* | 3/2017 | Ramalingam | H04L 63/083 |
| 9,710,640 B1* | 7/2017 | Ramalingam | G06F 21/445 |
| 9,742,757 B2* | 8/2017 | Canning | H04L 63/0807 |
| 9,749,310 B2* | 8/2017 | Li | H04L 63/0815 |
| 9,825,934 B1* | 11/2017 | Alexander | H04L 63/0815 |
| 9,852,286 B2* | 12/2017 | Aguilar-Macias | G06F 21/45 |
| 10,108,791 B1* | 10/2018 | Masterman | G06F 21/32 |
| 2003/0208684 A1* | 11/2003 | Camacho | G06F 21/32 713/186 |
| 2004/0210771 A1* | 10/2004 | Wood | G06F 21/31 726/8 |
| 2005/0071645 A1 | 3/2005 | Girouard et al. | |
| 2006/0041756 A1* | 2/2006 | Ashok | G06F 21/31 713/183 |

(Continued)

FOREIGN PATENT DOCUMENTS

EP   2306361   4/2011
WO   2007/095265   8/2007

OTHER PUBLICATIONS

U.S. Appl. No. 62/032,390, filed Aug. 1, 2014, Specification, 10 pages.*

(Continued)

*Primary Examiner* — Victor Lesniewski
(74) *Attorney, Agent, or Firm* — Cooper Legal Group, LLC

(57) ABSTRACT

In one embodiment, an attempt to log in to a user account, by an application on a client device, is detected. It is determined whether the client device is a trusted device. An application password is generated and stored, by a server, in association with the client device and the user account based, at least in part, upon whether the client device is a trusted device.

22 Claims, 5 Drawing Sheets

(56) References Cited

U.S. PATENT DOCUMENTS

| | | | | |
|---|---|---|---|---|
| 2009/0210938 | A1* | 8/2009 | Childress | G06F 21/31 726/18 |
| 2010/0218238 | A1* | 8/2010 | Mouleswaran | G06F 21/335 726/4 |
| 2012/0060214 | A1* | 3/2012 | Nahari | G06F 21/316 726/19 |
| 2013/0198824 | A1* | 8/2013 | Hitchcock | G06F 21/00 726/6 |
| 2013/0227700 | A1* | 8/2013 | Dhillon | G06Q 50/01 726/26 |
| 2013/0298211 | A1 | 11/2013 | M'Raihi et al. | |
| 2014/0007195 | A1* | 1/2014 | Gupta | G06F 21/34 726/4 |
| 2014/0012997 | A1* | 1/2014 | Erbe | H04L 67/26 709/228 |
| 2014/0189799 | A1* | 7/2014 | Lu | H04L 63/08 726/4 |
| 2014/0215575 | A1* | 7/2014 | Hoyos | H04L 63/105 726/4 |
| 2014/0245389 | A1* | 8/2014 | Oberheide | H04L 63/0815 726/3 |
| 2014/0245396 | A1* | 8/2014 | Oberheide | H04L 63/08 726/4 |
| 2014/0310792 | A1* | 10/2014 | Hyland | H04L 63/0861 726/8 |
| 2015/0089568 | A1* | 3/2015 | Sprague | H04L 63/0876 726/1 |
| 2015/0237049 | A1* | 8/2015 | Grajek | H04L 63/0815 726/7 |
| 2015/0249540 | A1* | 9/2015 | Khalil | H04L 63/0853 713/158 |
| 2015/0326562 | A1* | 11/2015 | Belote | H04L 63/0815 726/4 |
| 2015/0326574 | A1* | 11/2015 | Amaladoss | H04L 67/14 726/7 |
| 2016/0034684 | A1* | 2/2016 | Aguilar-Macias | G06F 21/46 726/6 |
| 2016/0080360 | A1* | 3/2016 | Child | H04L 63/0815 726/6 |
| 2016/0105801 | A1* | 4/2016 | Wittenberg | H04W 4/029 455/411 |
| 2016/0156592 | A1* | 6/2016 | Walters | H04L 63/0272 726/7 |
| 2016/0180068 | A1* | 6/2016 | Das | G06F 21/32 726/7 |
| 2016/0285858 | A1* | 9/2016 | Li | H04L 63/0815 |
| 2017/0324731 | A1* | 11/2017 | Li | G06F 21/41 |

OTHER PUBLICATIONS

Soares, Liliana F.B.; Fernandes, Diogo, A.B.; Freire, Mario M.; Inacio, Pedro R. M.; "Secure User Authentication in Cloud Computing Management Interfaces", 32nd International Performance Computing and Communications Conference (IPCCC), IEEE, Dec. 6-8, 2013, 2 pages.*

Pu, Qiong; "An Improved Two-factor Authentication Protocol", Second International Conference on Multimedia and Information Technology, IEEE, Apr. 24-25, 2010, pp. 223-226.*

* cited by examiner

AUTO-CREATION OF APPLICATION PASSWORDS

BACKGROUND

The disclosed embodiments relate generally to computer-implemented methods and apparatus for automatically generating passwords associated with user accounts.

To gain access to resources of a computer system, an individual is often required to complete a login procedure. In some instances, the computer system may include a remote computer. Resources offered by a computer system may include, for example, data, applications, or various services offered by the computer system.

During the login process, the computer system typically identifies and authenticates an individual. Generally, authentication is performed using a password submitted by the individual. For example, a web site may provide a login page that enables the individual to submit a password to successfully log in to the web site.

A password is typically a word or string of characters and digits used for user authentication to prove identity or access approval to gain access to a resource offered by a computer system. Generally, an individual creates the password that the computer system will use to authenticate the individual during subsequent login processes.

SUMMARY

In one embodiment, an attempt to log in to a user account, by an application on a client device, is detected. It is determined whether the client device is a trusted device. An application password is generated and stored, by a server, in association with the client device and the user account based, at least in part, upon whether the client device is a trusted device.

In another embodiment, a device comprising a processor and a memory is configured to perform one or more of the above described method operations. In another embodiment, a computer readable storage medium having computer program instructions stored thereon are arranged to perform one or more of the above described method operations.

DETAILED DESCRIPTION OF THE SPECIFIC EMBODIMENTS

Figure 1:
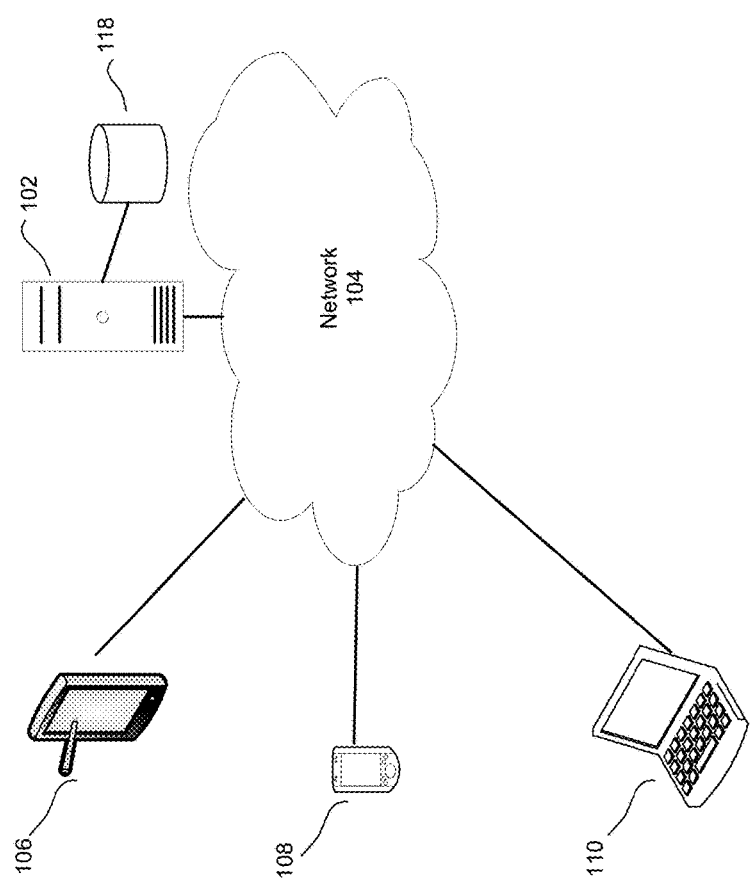
FIG. 1 is a diagram illustrating an example system in which various embodiments may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Traditionally, a user account has been accessed through submission of a user identifier (e.g., username) and single user-generated password. However, in an attempt to increase security, many popular services are now using a two-factor authentication process. To access these services, the user typically enters their username and password. A second password is then sent to the user's client device, which the user must enter to successfully log in to their user account.

In addition, some systems are eliminating the need for users to remember their user passwords by offering on demand password services. More particularly, a user may log in to their user account and opt-in to an on demand password service. For example, the user may log in to their user account and go to their security settings to turn on an on demand passwords setting. While the on demand passwords setting is turned on, the user's password may be deactivated. Instead, the user may request an on demand password that may be used by the user to log in to his or her account. For example, when the user tries to log in to the user account, the password field may be replaced by a button that enables the user to request a password with a single click. In response to a request for a password, an on demand password may be generated and transmitted to a client device of the user. The user may then use this system-generated on demand password to log in to their user account. To increase the security associated with on demand passwords, on demand passwords may expire after a short period of time.

Some applications are tied to a user's account. Such applications may include, for example, calendar, electronic mail, or various messaging applications. These applications are often configured to login on behalf of the user using the user's user identifier and password to retrieve new data from the user's account. For example, when a user purchases a mobile phone, the user typically enters their username and password on their mobile phone for each of their electronic mail accounts. When the user subsequently checks their mail on their mobile phone, the corresponding mail application will log in to the user's account on behalf of the user to retrieve the user's email. This process is fairly straightforward for systems that use a traditional single password for authentication. Unfortunately, many of these applications are not compatible with the new authentication mechanisms offered by many of today's systems.

When a third party application attempts to log in to a user account of a system implementing a two-factor authentication process, the log in attempt will typically fail. Similarly, when a third party application attempts to log in to a user account that has on demand passwords enabled, the application will be unable to log in to the user's account using the previously configured user password. When an application fails to successfully to log in to a user account of a system implementing a two-factor authentication process or on demand passwords, the application will typically provide an error message. This error message can be confusing to the user who does not understand the reason for the error. As a result, some users may choose to opt out of on demand passwords or two-factor authentication.

Some third party application providers are enabling consumers to enter a long string of characters via the third party applications as application passwords. These passwords are stored and used indefinitely by the applications to log in on behalf of the users. As a result, users generally have to manually type and save a password into each third party application that requires a password in order for the application to continue to operate. However, this can be confusing to users who have enabled on demand passwords for their accounts, and therefore no longer have a password for their accounts.

The disclosed embodiments enable various applications on a client device to log in to a user account without complying with various authentication processes. In some embodiments, this is accomplished through the automatic generation of a password by a server that recognizes the client device as a trusted device. Examples of systems and methods for implementing the disclosed embodiments will be described in further detail below.

Example System

FIG. 1 is a diagram illustrating an example system in which various embodiments may be implemented. As shown in FIG. 1, the system may include one or more servers 102. For example, the servers 102 may be associated with a web site that provides a variety of services to its users. More particularly, the server(s) 102 may include a web server, search server, and/or content server.

In accordance with various embodiments, users may access various services offered by the computer system by logging in to their user accounts. Such services may include on demand password services that support the implementation of on demand system-generated passwords for user accounts. More particularly, an on demand password feature may be enabled or disabled in response to a user action. In addition, an on demand system-generated password may be requested in response to a user action.

In some embodiments, a user action may include interaction with a system-provided indication (e.g., menu, icon, button, or hypertext link) or submission of a user-initiated request. For example, the user action may include selecting or activating an icon, button, or hypertext link using an input device (e.g., clicking on the indication using a mouse) or interacting with a touch screen of a client device (e.g., tapping on the system provided indication). As another example, the user action may include using a voice command or sending a short message service (SMS) message.

Where the on demand password feature is enabled for a particular user account, the server(s) 102 may disable or deactivate the current user password. Instead, the server(s) may support the generation of on demand system-generated passwords in response to user requests. On demand passwords may be transmitted to users via mechanisms including, but not limited to, SMS messages, electronic mail messages, or push notifications.

In addition, the server(s) 102 may implement system-generated application passwords to enable third party applications to log in to user accounts without satisfying the system's two-factor or on demand password authentication mechanism. More particularly, the server(s) 102 may generate and store application passwords for client devices that are "trusted," as will be described in further detail below.

The server(s) 102 may also provide services such as targeted content to users of the web site. A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on websites, in applications, or other places where users are more likely to see them, such as during an online session.

As shown in FIG. 1, a plurality of clients 106, 108, 110 may log in to their user accounts via the web site to access their accounts, purchase products, or access/receive various services offered to account holders by the web site. Such services may include on demand password services. In some embodiments, the services may include the transmission of personalized content to the clients 106, 108, 110. The services may also include email or other messaging services. Client devices may include, but are not limited to, desktop computers and/or portable devices (i.e., mobile devices) such as laptops, mobile phones, and tablets.

Services may be provided to the clients 106, 108, 110 via applications implemented by the servers 102 and/or the clients 106, 108, 110. The clients 106, 108, 110 may access a web service, for example, on a web server via network 104 using a graphical user interface. In some embodiments, the clients 106, 108, 110 may access on demand services offered by the servers 102 via network 104.

The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which various embodiments may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A system supporting application password services may be implemented on any number of servers although only a single server 102 is illustrated for clarity. Various embodiments disclosed herein may be implemented via the server 102 and/or the clients 106, 108, 110. The disclosed embodiments may be implemented via software and/or hardware.

In some embodiments, the server(s) 102 may provide on demand password services to account holders. More particularly, on demand password services may enable users to opt-in to use on demand system-generated passwords instead of their current user password. In addition, on demand password services may include the generation and transmission of system-generated passwords by the server 102 to the clients 106, 108, 110 on an on demand basis in response to requests, which may be received from the clients 106, 108, 110 or other devices.

In addition, the servers 102 may generate application passwords for user accounts, as will be described in further detail below. However, since the operating systems vary among devices, the application passwords would be difficult to configure on the devices. Thus, in accordance with various embodiments, the servers 102 do not transmit the application passwords to the clients 106, 108, 110. Rather, the application passwords may be stored in one or more memories 118 coupled to the servers 102 for subsequent retrieval by the servers 102.

In some embodiments, the server(s) 102 may generate application passwords for "trusted devices" attempting to log in to user accounts that have opted-in to use system-generated on demand passwords instead of the previously configured user password. In other embodiments, the server(s) may support two-factor authentication and generate application passwords for "trusted devices" attempting to log in to user accounts. Example methods of generating application passwords will be described in further detail below.

Users that are members of the web site, access content or other services of the web site, or receive services such as personalized content from the web site may have user accounts that are maintained by the system. In accordance with various embodiments, the server(s) 102 may have access to one or more databases into which account information is retained for each of a plurality of user accounts. The databases may be retained in one or more memories 118 that are coupled to the server 102.

The account information pertaining to a user account may include a user identifier. The user identifier may uniquely identify an account owner (e.g., user) within the system. For example, the user identifier may include a sequence of alphanumeric characters such as a social security number, a phone number, a family name (e.g., Chris Stoner), a username (e.g., Stoner408), or an email address. In accordance with various embodiments, the user identifier is a username that corresponds to an email address associated with the user account. In other embodiments, the user identifier may be determined using other mechanisms. For example, a user may be identified using biometric authentication methods such as a deoxyribonucleic acid (DNA), retina scan, finger print recognition, or facial recognition. As another example, a user may be identified using a possession factor device such as a universal serial bus (USB) security token, near field communication (NFC) device, or smart card.

In addition, the account information may include one or more passwords. More particularly, the account information may include a user password previously established by a user and/or an on demand password. In addition, the account information may indicate whether on demand password services are active (e.g., as a result of opt-in by a user). In other words, the account information may indicate whether a user specified user password and/or on demand password is currently active. The account information may also indicate the time that the last on demand password was requested, generated, transmitted, or otherwise activated. In addition, the account information may indicate the amount of time that an active on demand password remains active.

Where an application password has been generated for the user account, the application password may be stored in association with a device identifier, which may include an Internet Protocol (IP) address, Media Access Control (MAC) address, IDFV/IDFA (Advertising ID), or other identifier. The application password may also be stored in association with one or more applications. Therefore, one or more application passwords may be stored in association with a user account.

In accordance with various embodiments, the account information for a user account may also include device information pertaining to the client device(s) previously used to log in to the user account. For example, the device information may include an IP address, MAC address, browser identifier, and/or geographic location from which the corresponding client device was accessed. The account information may also indicate the number of times or frequency with which the devices and/or corresponding locations were used to access the user account. In some embodiments, the account information may include historical login information. For example, the historical login information may include for each session, a device identifier of a device via which login to the user account was performed, a timestamp indicating a date and/or time of the login, and/or a location from which login to the user account was performed.

In some embodiments, the account information may further include personal information such as demographic information (e.g., birth date, age, occupation, and/or gender) and/or geographic information (e.g., residence address, work address, zip code, and/or area code). The account information may also include credit card information, enabling account owners to be charged for various products or services offered by the web site.

In addition, each time a user performs online activities such as logging in to a user account via the web site, opting in to use on demand password services, submitting a password request, performing a search, clicking on a web page or an advertisement, or purchasing goods or services, information regarding such activity or activities may be retained in account logs. For instance, the data that is retained in the user logs may indicate the identity of web sites visited, identity of ads that have been selected (e.g., clicked on), client device information (e.g., browser identifier, IP address, and/or MAC address), geographic location of the client device, and/or a timestamp. Therefore, each time a user logs in to a user account or an application logs in to the user account on behalf of the user, client device information (e.g., browser identifier, IP address, and/or MAC address), a geographic location of the client device, and/or a timestamp may be recorded in the account logs.

Figure 2:
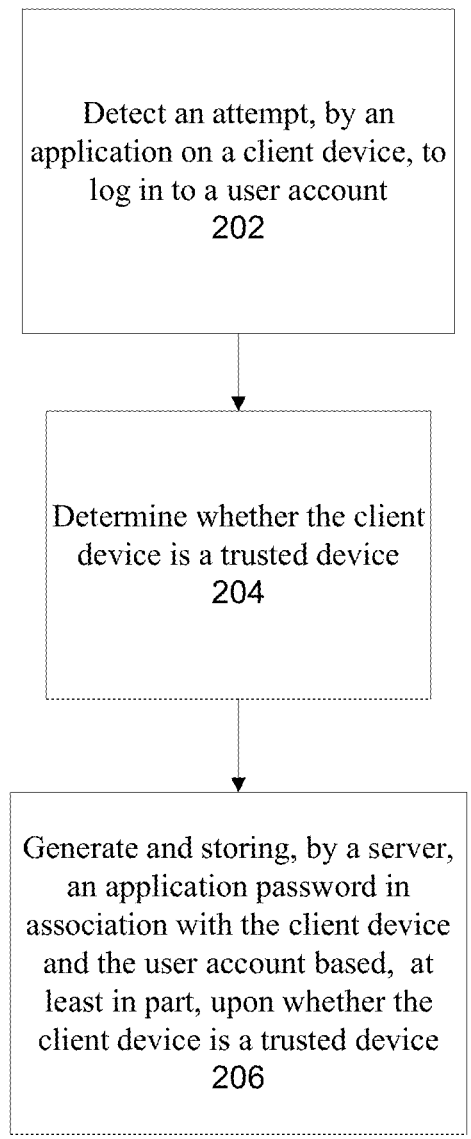
FIG. 2 is a process flow diagram illustrating an example process of implementing application passwords in accordance with various embodiments.

FIG. 2 is a diagram illustrating an example method of implementing application passwords. As shown in FIG. 2, the system may detect an attempt (e.g., by an application on a client device) to log in to a user account at 202. More particularly, a server may receive a user identifier (e.g., username) and a password.

Where the system implements a two-factor authentication process or on demand passwords are enabled for the user account, the log in attempt would typically fail. However, in accordance with various embodiments, the system may determine whether the client device is a trusted device at 204.

In some embodiments, the system may determine whether it has previously generated an application password for the user account in association with the client device and/or application. More particularly, the system may determine whether an application password is stored in association with the client device for the user account. For example, the system may determine whether an application password is stored in the user account information for the application that is attempting to log in to the user account on behalf of the account owner. If the system is able to retrieve an application password for the client device and/or application, the system may determine that the client device is a trusted device.

Assuming that the system is unable to retrieve an application password for the client device and/or application for the user account, the system may determine whether the client device is a trusted device based upon various factors. Examples of some of these factors will be described in further detail below.

In some embodiments, the system may determine whether the client device is a trusted device by sending an authorization request to an account owner associated with the user account. For example, the system may send an authorization request to the account owner if this is the first time that the system detects that a third party application is attempting to login to the user account using a password that is not currently active. The authorization request may notify the account owner that the third party application is attempting to login to the user account on behalf of the account owner. The account owner may approve or decline the authorization request. The system may then ascertain whether the account owner has approved the authorization request. Upon receiving an approval of the authorization request from the account owner, the system may determine that the client device is a trusted device. An authorization request and approval may be transmitted via a variety of mechanisms such as SMS messages, electronic mail (email) messages, or push notifications. Therefore, the system may generate and store an application password according to whether the account owner has approved the authorization request.

In accordance with various embodiments, the system may determine whether the client device is a trusted device based, at least in part, on whether the password provided by the client device was at one time a valid password. More particularly, the system may determine whether the password received from the client device was a previously active password of the user account. For example, where the user has opted-in to use on demand passwords, the prior user password may be saved in the user account and flagged as the previous user password. Therefore, if the password provided by the client device was a previously active user password, the system may determine that the client device is a trusted device.

When the application attempts to log in to the user account, the system may obtain device information associated with the client device. More particularly, the device information may include a device identifier of the client device. For example, the device identifier may include an IP address, MAC address, IDFV/IDFA, or other identifier. In some embodiments, the device information may also include a location of the client device. For example, the server may ascertain a country or other geographic location of the client device from an IP address of the client device.

In addition, the system may obtain historical login information associated with the user account from the account logs. For example, the historical login information may indicate, for each session, a device identifier of a device via which login to the user account was performed, a timestamp indicating a date and/or time of the login, and/or a location from which login to the user account was performed. Therefore, the historical login information may indicate one or more locations via which the owner of the user account has logged in to the user account or, alternatively, locations via which application(s) have logged in to the user account on behalf of the owner.

The system may determine, from the historical login information and the device information, whether the client device is a trusted device. In some embodiments, the system may ascertain whether the client device is a trusted device based, at least in part, on a number of times that the client device has previously logged in to the user account and/or a recency with which the client device has previously logged in to the user account. If the client device has logged into the user account at least a threshold number of times, the system may ascertain that the client is a trusted device. Similarly, if the client device has logged into the user account recently (e.g., within the past day or week), the system may ascertain that the client is a trusted device.

In one embodiment, the system may ascertain whether the client device is a trusted device based, at least in part, on a number of times that the client device has previously logged in to the user account from the location and/or a recency with which the client device has previously logged in to the user account from the location. If the client device has logged into the user account from the location at least a threshold number of times, the system may ascertain that the client is a trusted device. Similarly, if the client device has logged into the user account from the location recently (e.g., within the past day or week), the server may ascertain that the client is a trusted device.

In some embodiments, the system may determine whether the client device is a trusted device based, at least in part, on whether the client device is registered for push notifications with the user account. For example, the client device may have registered to receive on demand passwords via a push channel. If a push channel has been established for the client device, this may indicate that the account owner has acknowledged the client device as a device that is authorized to receive push notifications for the user account. Therefore, if the client device is registered for push notifications with the user account, the system may determine that the client device is a trusted device.

The server may generate and store an application password in association with the client device and user account based, at least in part, upon whether the client device is a trusted device at 206. More particularly, the server may generate and store an application password upon determining that the client device is a trusted device. In some embodiments, the server may generate and store the application password automatically without human intervention. In other embodiments, the server may generate and store the application password in response to approval of an authorization request. The application password may be stored in the account information for the user account. Thus, the application password need not be provided to the client device for the application to successfully log in to the user account. In some embodiments, the application password may be stored in association with the application that has attempted to log in on behalf of the user. As a result, the application password may be application-specific, enabling an application to log in to a user account on behalf of the account owner using the application password. Alternatively, the application password may be used by multiple applications installed on the client device to successfully log in to the user account.

The user may subsequently choose to opt out of the use of on demand system-generated passwords. In these instances, the system may reactivate a previously deactivated password (e.g., by modifying a corresponding flag in the account information). In this manner, the system may enable the user to use their previous user password. The system may present a success dialog and/or transmit a notification to inform the user that they have successfully opted out of using system-generated passwords.

In some embodiments, where the user has opted out of the use of on demand system-generated passwords or two-step verification, the system may disable or delete previously system-generated application passwords for the user account. Alternatively, previously generated application passwords for the user account may be maintained even after the user has opted out of the use of on demand system-generated passwords.

In accordance with various embodiments, the account owner may choose to revoke an application password or de-authorize a particular device from having access to his or her account. For example, the account owner may submit a request via a graphical user interface, SMS message, or other suitable mechanism to revoke an application password or de-authorize the particular device from having access to the account. The server may update the account information for the user account by deleting the application password or otherwise updating the account information to indicate that the account owner has revoked the application password or de-authorized the corresponding client device from having access to the account.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 3:
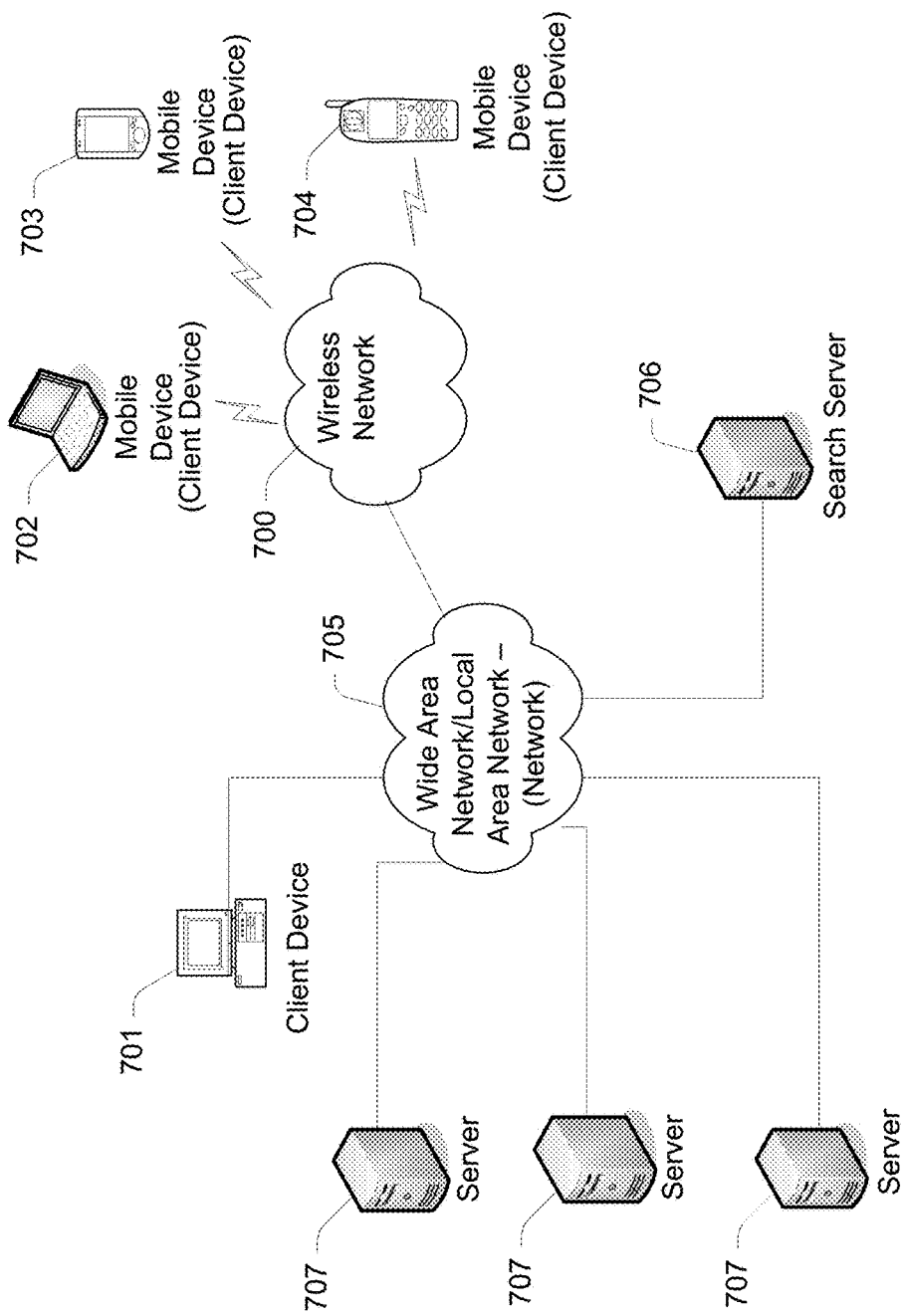
FIG. 3 is a schematic diagram illustrating an example embodiment of a network in which various embodiments may be implemented.

The disclosed embodiments may be implemented in any of a wide variety of computing contexts. FIG. 3 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 3, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed embodiments may be implemented in some centralized manner. This is represented in FIG. 3 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 4:
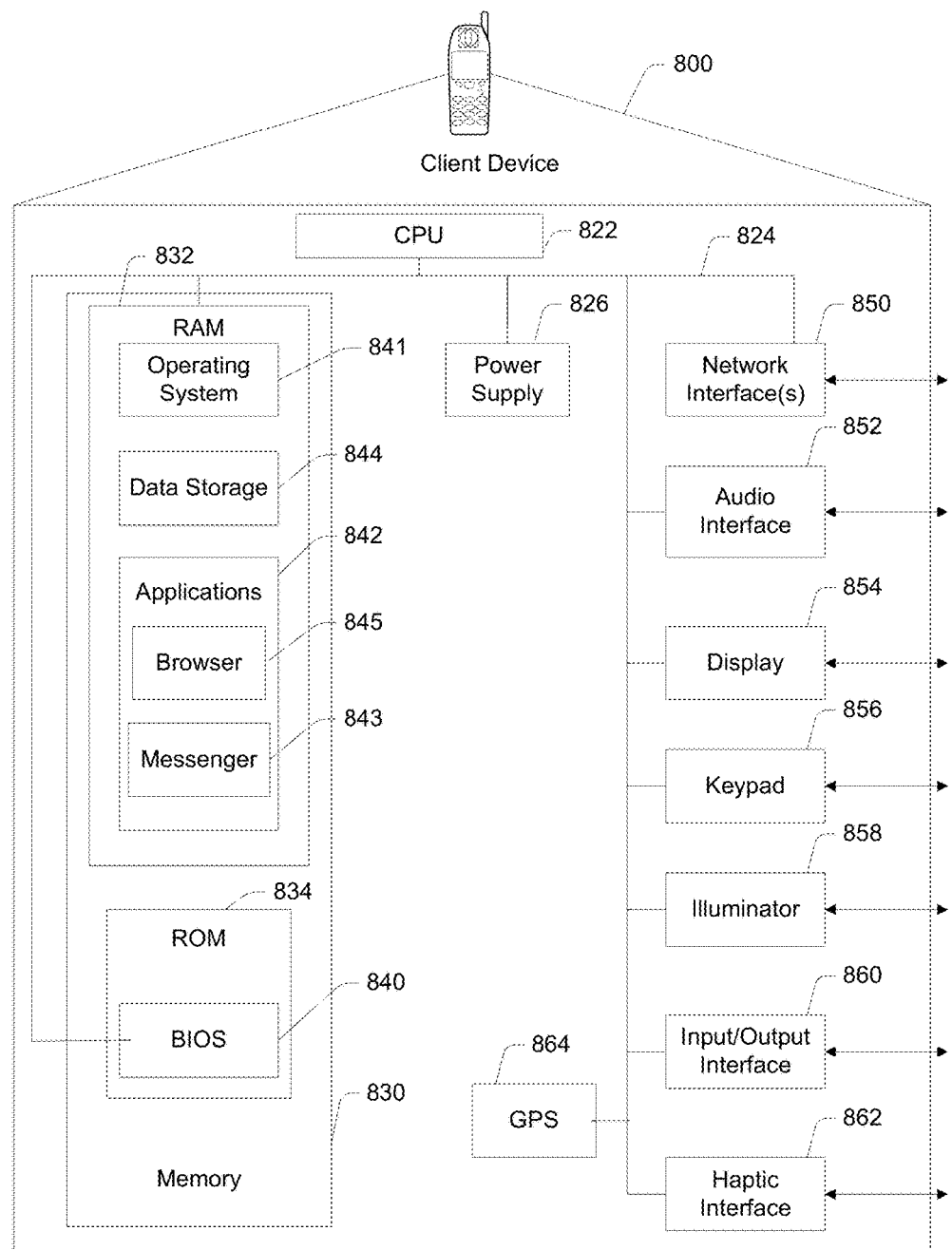
FIG. 4 is a schematic diagram illustrating an example client device in which various embodiments may be implemented.

FIG. 4 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 5:
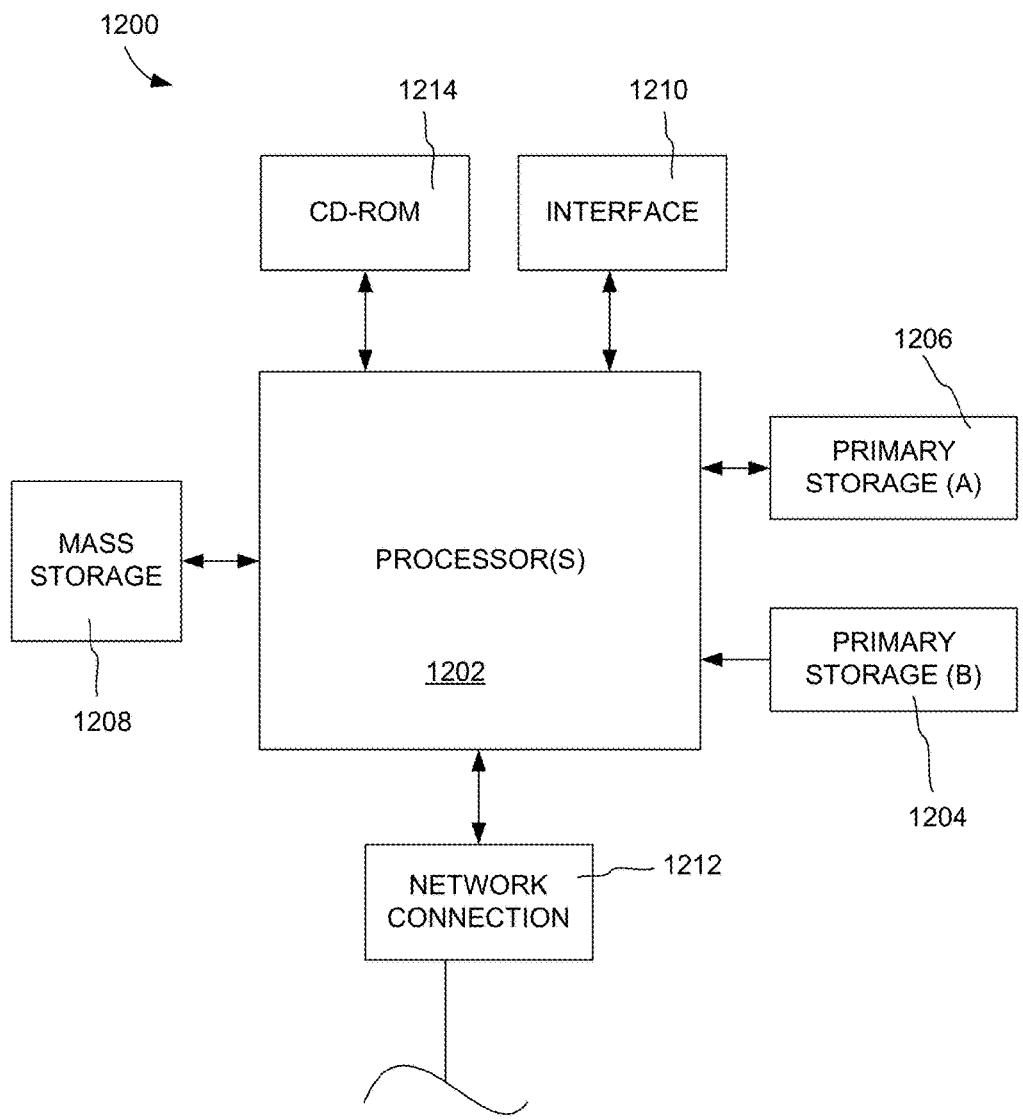
FIG. 5 is a schematic diagram illustrating an example computer system in which various embodiments may be implemented.

FIG. 5 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may include a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the embodiments are not to be limited to the details given herein, but may be modified within the scope and equivalents of the appended claims.

What is claimed is:

1. A method, comprising:
    detecting, by one or more server computers, an attempt, by an application on a client device, to log in to a user account associated with the application using a first password, the one or more server computers being configured to implement a two-factor authentication process;
    determining, by the one or more server computers, that the first password is stored in account information for the user account as the first factor of the two-factor authentication process;
    obtaining, by the one or more server computers, device information associated with the client device, the device information including a device identifier of the client device and a geographic location of the client device;
    obtaining, by the one or more server computers, historical login information associated with the user account;
    determining, by the one or more server computers from the historical login information and the device information, at least one of a number of times that the client device has previously logged in to the user account from the geographic location or a recency with which the client device has previously logged in to the user account from the geographic location;
    determining, by the one or more server computers, whether the client device is a trusted device based, at least in part, on at least one of the number of times that the client device has previously logged in to the user account from the geographic location or the recency with which the client device has previously logged in to the user account from the geographic location;
    generating and storing, by the one or more server computers, without human intervention, a second password in association with the client device and the user account at least in part in response to determining that the client device is a trusted device and
    logging, by the one or more server computers, the application into the user account using the second password as the second factor of the two-factor authentication process.

2. The method as recited in claim 1, wherein determining whether the client device is a trusted device is performed based, at least in part, on the number of times that the client device has previously logged in to the user account from the geographic location.

3. The method as recited in claim 1, wherein detecting an attempt, by an application on a client device, to log in to a user account comprises receiving the first password, the method further comprising:
    determining, from the account information for the user account, whether the first password is an active password of the user account.

4. The method as recited in claim 1, wherein determining whether the client device is a trusted device further comprises:
    determining whether a push channel has been established for the client device.

5. The method as recited in claim 1, wherein the second password is further stored in the account information for the user account such that both the first password and the second password are active passwords for the user account.

6. The method as recited in claim 1, wherein the application is an electronic mail application and the user account is an electronic mail account.

7. The method as recited in claim 1, wherein determining whether the client device is a trusted device is performed based, at least in part, on the recency with which the client device has previously logged in to the user account from the geographic location.

8. The method as recited in claim 1, wherein determining whether the client device is a trusted device is performed based, at least in part, on the number of times that the client device has previously logged in to the user account from the geographic location and the recency with which the client device has previously logged in to the user account from the geographic location.

9. The method as recited in claim 1, wherein the second password is not transmitted to the client device.

10. The method as recited in claim 1;
    wherein generating and storing the second password are performed after determining that the first password is stored in the account information for the user account, the second password being stored such that both the first password and the second password are stored in the account information for the user account.

11. The method as recited in claim 1, further comprising:
    applying the first password according to the two-factor authentication process prior to generating the second password.

12. The method as recited in claim 1, wherein the second password and the first password are both concurrently active passwords for the user account.

13. The method as recited in claim 1, wherein the second password does not replace the first password.

14. A system, comprising:
    one or more servers, the one or more servers including one or more processors and one or more memories, the servers being configured to:
    detect an attempt, by an application on a client device, to log in to a user account associated with the application using a first password, the servers being configured to implement a two-factor authentication process;
    determine that the first password is stored in account information for the user account as the first factor of the two-factor authentication process;
    obtain device information associated with the client device, the device information including a device identifier of the client device and a geographic location of the client device;

obtain historical login information associated with the user account;

determine, from the historical login information and the device information, at least one of a number of times that the client device has previously logged in to the user account from the geographic location or a recency with which the client device has previously logged in to the user account from the geographic location;

determine whether the client device is a trusted device based, at least in part, on at least one of the number of times that the client device has previously logged in to the user account from the geographic location or the recency with which the client device has previously logged in to the user account from the geographic location;

generate and store a second password in association with the client device and the user account, without human intervention, at least in part in response to determining that the client device is a trusted device; and log the application into the user account using the second password as the second factor of the two-factor authentication process.

15. The system as recited in claim 14, wherein determining whether the client device is a trusted device further comprises:

sending an authorization request to an account owner associated with the user account; and ascertaining whether the account owner has approved the authorization request;

wherein generating and storing the second password is performed according to whether the account owner has approved the authorization request.

16. The system as recited in claim 14, wherein determining whether the client device is a trusted device is performed based, at least in part, on the number of times that the client device has previously logged in to the user account from the geographic location.

17. The system as recited in claim 14, wherein determining whether the client device is a trusted device further comprises:

determining whether a push channel has been established for the client device.

18. The system as recited in claim 14, wherein the second password is not transmitted to the client device.

19. The system as recited in claim 14, wherein the second password is stored such that both the first password and the second password are stored in the account information associated with the user account.

20. A computer program product, comprising:

one or more non-transitory computer readable storage media having computer program instructions stored therein, the computer program instructions being configured such that, when executed by one or more computing devices, the computer program instructions cause the one or more computing devices to:

detect an attempt, by an application on a client device, to log in to a user account associated with the application using a first password, the one or more computing devices configured to implement a two-factor authentication process;

determine that the first password is stored in account information for the user account as the first factor of the two-factor authentication process;

obtain device information associated with the client device, the device information including a device identifier of the client device and a geographic location of the client device;

obtain historical login information associated with the user account;

determine, from the historical login information and the device information, at least one of a number of times that the client device has previously logged in to the user account from the geographic location or a recency with which the client device has previously logged in to the user account from the geographic location;

determine whether the client device is a trusted device based, at least in part, on at least one of the number of times that the client device has previously logged in to the user account from the geographic location or the recency with which the client device has previously logged in to the user account from the geographic location;

generate and store, without human intervention, a second password in association with the client device and the user account at least in part in response to determining that the client device is a trusted device; and log the application into the user account using the second password as the second factor of the two-factor authentication process.

21. The computer program product as recited in claim 20, wherein determining whether the client device is a trusted device is performed based, at least in part, on the number of times that the client device has previously logged in to the user account from the geographic location.

22. The computer program product as recited in claim 20, wherein determining whether the client device is a trusted device further comprises:

determining whether a push channel has been established for the client device.

* * * * *